(12) United States Patent
Aguren et al.

(10) Patent No.: US 11,550,728 B2
(45) Date of Patent: Jan. 10, 2023

(54) SYSTEM AND METHOD FOR PAGE TABLE CACHING MEMORY

(71) Applicant: ADVANCED MICRO DEVICES, INC., Santa Clara, CA (US)

(72) Inventors: Derrick Allen Aguren, Austin, TX (US); Eric H. Van Tassell, Austin, TX (US); Gabriel H. Loh, Bellevue, WA (US); Jay Fleischman, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 3 days.

(21) Appl. No.: 16/586,183

(22) Filed: Sep. 27, 2019

(65) Prior Publication Data

US 2021/0097002 A1  Apr. 1, 2021

(51) Int. Cl.
*G06F 12/00* (2006.01)
*G06F 12/06* (2006.01)
*G06F 12/1009* (2016.01)
*G06F 12/14* (2006.01)
*G06F 9/455* (2018.01)
*G06F 12/0891* (2016.01)
*G06F 9/54* (2006.01)

(52) U.S. Cl.
CPC ...... *G06F 12/1009* (2013.01); *G06F 9/45558* (2013.01); *G06F 12/0891* (2013.01); *G06F 12/1475* (2013.01); *G06F 9/545* (2013.01); *G06F 2009/45583* (2013.01)

(58) Field of Classification Search
CPC ............ G06F 12/1009; G06F 9/45558; G06F 12/0891; G06F 12/1475; G06F 9/545; G06F 2009/45583
See application file for complete search history.

(56) References Cited

U.S. PATENT DOCUMENTS

| | | | |
|---|---|---|---|
| 6,223,256 B1 * | 4/2001 | Gaither | G06F 12/126 711/118 |
| 2002/0082823 A1 * | 6/2002 | Traut | G06F 9/45558 703/27 |
| 2006/0236063 A1 * | 10/2006 | Hausauer | G06F 12/1081 711/170 |

(Continued)

OTHER PUBLICATIONS https://web.archive.org/web/20190421160107/https://en.wikipedia.org/wiki/Page_table Page table From Wikipedia, the free encyclopedia (Year: 2019).*

(Continued)

*Primary Examiner* — Shawn X Gu
*Assistant Examiner* — Mohammad S Hasan (57) ABSTRACT

A processing system includes a processor, a memory, and an operating system that are used to allocate a page table caching memory object (PTCM) for a user of the processing system. An allocation of the PTCM is requested from a PTCM allocation system. In order to allocate the PTCM, a plurality of physical memory pages from a memory are allocated to store a PTCM page table that is associated with the PTCM. A lockable region of a cache is designated to hold a copy of the PTCM page table, after which the lockable region of the cache is subsequently locked. The PTCM page table is populated with page table entries associated with the PTCM and copied to the locked region of the cache.

20 Claims, 4 Drawing Sheets

(56) References Cited

U.S. PATENT DOCUMENTS

| | | | | |
|---|---|---|---|---|
| 2006/0268124 | A1* | 11/2006 | Fishman | H04N 1/2137 |
| | | | | 348/231.99 |
| 2008/0028181 | A1* | 1/2008 | Tong | G06T 1/60 |
| | | | | 711/207 |
| 2013/0111605 | A1* | 5/2013 | Maeda | G06F 21/14 |
| | | | | 726/27 |
| 2017/0286318 | A1* | 10/2017 | Brannock | G06F 12/1009 |
| 2019/0012270 | A1* | 1/2019 | Imazaki | G06F 11/1076 |
| 2019/0087350 | A1* | 3/2019 | John | G06F 12/126 |
| 2019/0146693 | A1* | 5/2019 | Severino | G06F 12/1036 |
| | | | | 711/163 |
| 2020/0167086 | A1* | 5/2020 | Tsirkin | G06F 12/1009 |

OTHER PUBLICATIONS

"HPE Unveils Computer Built for the Era of big Data", Hewlett Packard Enterprise Website Press Release, May 16, 2017, 11 pages.

Kocberber, Onur, et al., "Meet the Walkers: Accelerating Index Traversals for In-Memory Databases", Proceedings of the 46th Annual IEEE/ACM International Symposium on Microarchitecture, Dec. 7-11, 2013, 12 pages.

* cited by examiner

SYSTEM AND METHOD FOR PAGE TABLE CACHING MEMORY

BACKGROUND

High-performance computing and data center processing systems often employ large virtual memory regions with highly irregular access patterns. Example applications for which these memory objects are characteristic include key-value pair lookups, memory-resident databases, and graph applications. Use of these types of regions exceeds the capacity of the processor's dedicated address translation caches, for example, translation lookaside buffers (TLBs), resulting in greatly increased address translation latency and poor application performance. Therefore, a need exists to develop processing systems that reduce address translation latency.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate systems and methods for allocating and de-allocating page table caching memory objects (PTCMs) of a processing system. The page tables that are used to map the virtual address space of the PTCM to the physical address space of system memory are copied to and locked in designated regions of the processor caches in order to prevent the page tables from being evicted. By preventing the page tables from being evicted from the processor caches, page table walker accesses by the processor memory management unit (MMU) to non-cached memory are eliminated, resulting in an increase in memory access performance. The PTCMs, which can be, for example, terabytes in size (e.g., 1134 gibibyte (GiB)), are made available for users of the processing system to program as a normal memory object. The user of the processing system provisions, allocates, and de-allocates PTCMs via one or more of special registers, instructions, system library calls, administrator commands, or kernel boot arguments.

Figure 1:
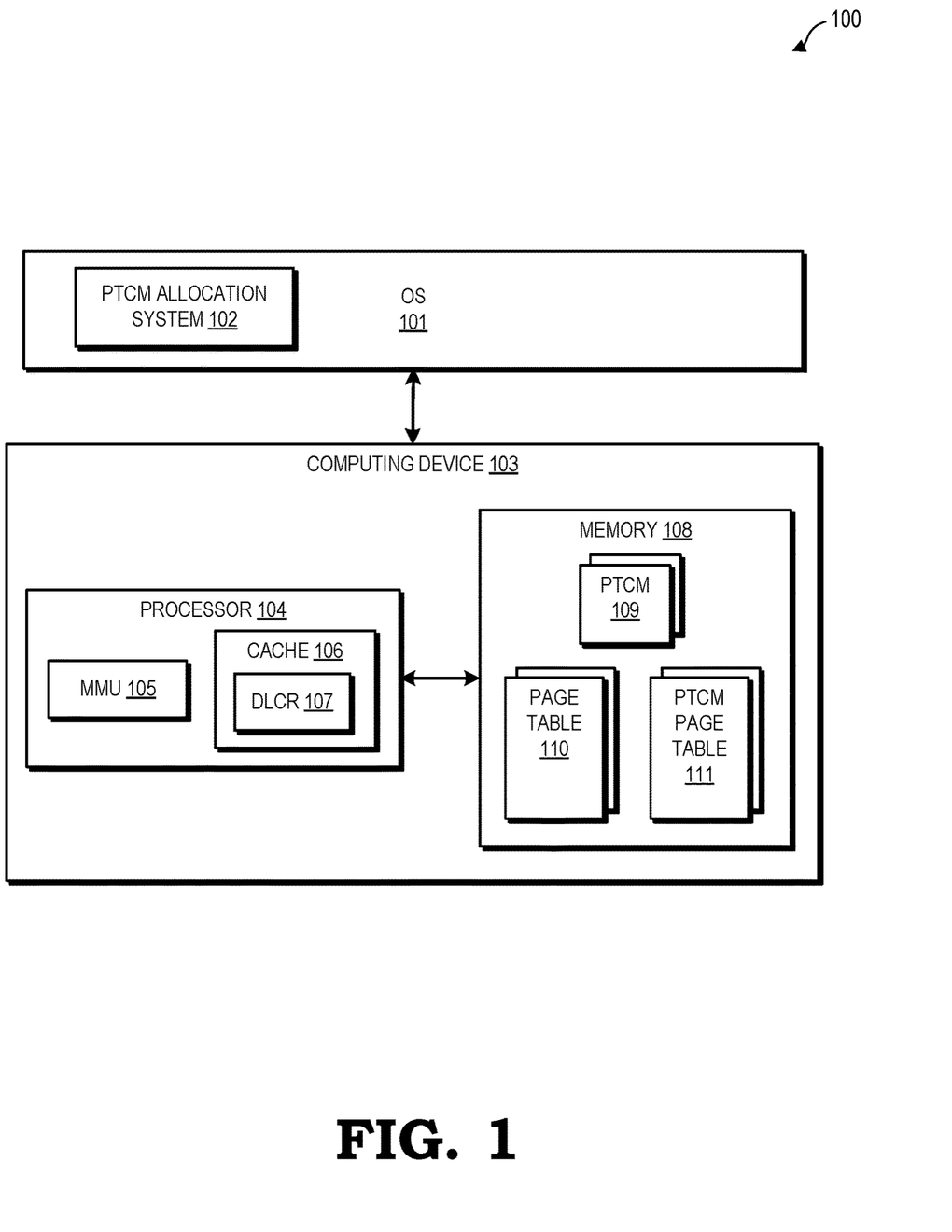
FIG. 1 is a block diagram of a processing system that allocates page table caching memory objects (PTCMs) in accordance with some embodiments.

FIG. 1 is a block diagram of a processing system 100 illustrating the allocation of a PTCM in accordance with some embodiments. Processing system 100 includes a computing device 103 and an operating system (OS) 101. Computing device 103 includes a processor 104 and a memory 108.

Processor 104 is a device that performs computational operations in processing system 100. For example, processor 104 can be a central processing unit (CPU), graphics processing unit (GPU), or application specific integrated circuit (ASIC). Processor 104 includes a memory management unit (MMU) 105 and a cache 106. The cache 106 includes memory circuits such as one or more of static random access memory (SRAM), dynamic random access memory (DRAM), double data rate synchronous DRAM (DDR SDRAM), and/or other types of memory circuits for storing data and instructions for use by other units of processor 104, as well as control circuits for handling accesses of the data and instructions that are stored in the memory circuits.

Memory 108 includes memory circuits such as one or more of DRAM, DDR SDRAM, non-volatile random access memory (NVRAM), and/or other types of memory circuits for storing data and instructions for use by functional blocks in processing system 100, as well as control circuits for handling accesses of the data and instructions that are stored in the memory circuits. Memory 108 includes a PTCM 109, page tables 110, and PTCM page tables 111.

In some embodiments, the user's view of the memory is in terms of "virtual addresses" in a "virtual address space," which is an address space that is specific to a corresponding program, instead of accessing memory directly using addresses based on the physical locations of pages (or "physical addresses"). The virtual addresses, however, cannot map directly to the physical addresses of the physical locations where data is stored in pages in the memory. As part of keeping track of the physical locations of pages, MMU 105 translates the virtual addresses used by the programs executing on processor 104 using page tables 110 into the physical addresses of memory 108 where the user's data is located. The page tables 110 are records of the processing system 100 that include an entry, or a "page table entry" ("PTE"), with virtual address to physical address translation information for pages of data that are stored in the memory. In other words, the page tables 110 implement "mappings" or "page table tree mappings" of virtual addresses to corresponding physical addresses. In various embodiments these mappings are structured as tree of individual page tables and mapping from a virtual address to a virtual address is conducted by a "page table walker" that executes "page table walks" navigating the tree. In various embodiments, page table walks are conducted in either hardware or software.

As is the case in typical processing systems, the MMU 105 of processing system 100 includes translation lookaside buffers ("TLBs") (not shown), which are local caches that are used for storing a limited number of copies of page table entries acquired during page table walks (or information based on page table entries). Typically, on a memory access the processing system 100 first attempts to acquire cached page table entries from the corresponding TLB for performing virtual address to physical address translations. However, in some embodiments, when the copy of the corresponding page table entry is not present in the TLB (i.e., when a "miss" occurs), the processing system 100 performs a page table walk of the page tables to acquire the desired page table entry.

In various embodiments, in order to enable the above-described virtual address to physical address translations associated with PTCM 109, the processing system 100 includes PTCM page tables 111 that, in addition to being allocated in memory 108, are initialized with PTEs and related data and linked with other page tables 110. PTCM page tables 111 are navigated in the same manner as page tables 110 by page table walkers without modification. Cache 106 includes a designated lockable cache region of the processor cache 107 (DLCR) that operates to store a copy of and lock the PTCM's page tables 111 that are associated with the PTCM 109 of memory 108.

In some embodiments, initiated by, for example, a system library call that is invoked by the user of processing system 100 to allocate the PTCM 109, the PTCM allocation process is controlled by PTCM allocation system 102. In some embodiments, PTCM allocation system 102 is software located in, for example, OS 101. In various embodiments, PTCM allocation system 102 allocates and de-allocates PTCM page tables 111. In further embodiments PTCM allocation system 102 populates the PTCM page tables 111 and links the PTCM page tables 111 with other page tables 110. In further embodiments, PTCM allocation system 102 designates one or a plurality of DLCRs 107. In yet further embodiments, PTCM allocation system 102 manages the movement of PTCM page tables 111 to DLCRs 107. In yet further embodiments, PTCM allocation system 102 locks and unlocks the DLCRs 107 via commands to processor 104. In further embodiments, PTCM allocation system 102 reacts to system activities, e.g. entering and exiting power saving modes, that can flush DLCRs and re-loads PTCM page tables 111.

In one embodiment, PTCM allocation system 102 allocates and reserves a pool of contiguous pages in memory 108 that operate as PTCM page tables 111. In some embodiments, the size of this pool is specified by a kernel boot parameter or at kernel compile time and the pool is allocated by PTCM allocation system 102 during OS startup. In yet further embodiments the size of the pool is determined by a system call at runtime and the pool is allocated (or resized) post startup. In some embodiments, after the pool of pages have been reserved in memory 108, PTCM allocation system 102 allocates a lockable region of processor memory cache 106 (i.e., DLCR 107) to store copies of the PTCM page tables 111. Upon initiation of the allocation process of the PTCM, processor 104 locks a portion of cache 106 (i.e., DLCR 107) that is set-aside for PTCM allocation. In one embodiment, the size of the designated portion of cache 106 that is locked by processor 104 corresponds to the span of the address range of contiguous PTCM page tables 111 allocated from the pool of pages required to complete the page tables of the PTCM 109. In some embodiments only a subset of the page tables required by the PTCM 109 are allocated from this pool and the remaining page tables are page tables 110 and will not be copied and locked in DLCR 107 by PTCM allocation system 102 managed mechanisms (though they can be copied into 106 by other OS 101 and processor 104 mechanisms not related to page table caching). PTCM allocation system 102 then populates the PTCM page tables 111 and copies them to DLCR 107. In some embodiments, the pool of pages is reserved after the initiation of PTCM allocation. In yet other embodiments, PTCM page tables 111 need not all be contiguous in memory to be lockable in one or more DLCRs 107 such that each grouping of PTCM page tables 111, which can be unitary, is mapped to a DLCR 107 individually.

Figure 2:
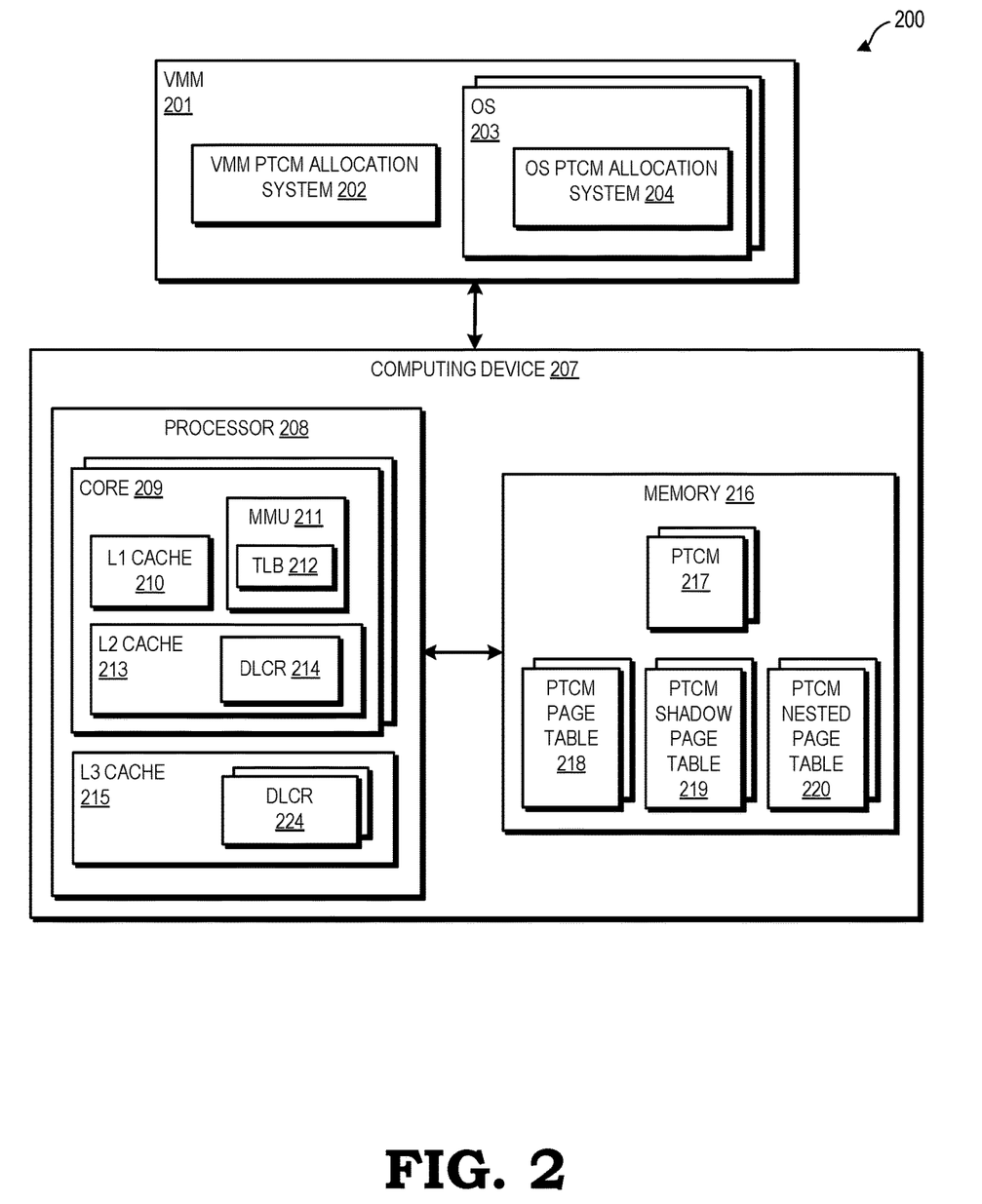
FIG. 2 is a block diagram of the processing system of FIG. 1 further illustrating the allocation of a PTCM in accordance with some embodiments.

FIG. 2 presents a block diagram illustrating a processing system 200 depicting the processing system 100 of FIG. 1 in greater detail and with additional features in accordance with some embodiments. Processing system 200 includes a computing device 207, which includes a processor 208 and a memory 216. In some embodiments, processing system 200 also includes a virtual machine monitor ("VMM") 201, also known as a "hypervisor". In the case of VMM 201 being present, there are one or a plurality of OSs 203 each running on a distinct virtual machine controlled by VMM 201, then referred to as "guest OSs". In some embodiments, VMM 201 is absent and there is only one OS 203 executing on processor 208.

As stated previously above, processor 208 performs computational operations in processing system 200. Processor 208 describes one or a plurality of cores 209 which perform computational and other operations in parallel with respect to each other and in further embodiments share resources outside the cores but within processor 208 such as a cache. In some embodiments, each core 209 includes an L1 cache 210, and an MMU 211. In further embodiments, each MMU 211 contains translation look aside buffers (TLBs) 212. In yet further embodiments, each core 209 contains an L2 cache 213, which is typically larger than L1 cache 210. In some embodiments, processor 208 includes a shared L3 cache 215 for storing data and instructions for use by one or a plurality of cores 209. L3 cache 215 is typically larger than an individual L2 cache 213. Each cache and TLB includes memory circuits, such as one or more of static random access memory (SRAM), dynamic random access memory (DRAM), double data rate synchronous DRAM (DDR SDRAM), and/or other types of memory circuits for storing data and instructions for use by the corresponding core 209, as well as control circuits for handling accesses of the data and instructions that are stored in the memory circuits.

Memory 216 is the main memory of processing system 200. In one embodiment, memory 216 contains PTCM 217 and the PTCM page tables 218. In further embodiments, in the case where virtual machines are executed by processing system 200, the virtual machines can have corresponding regions of memory allocated by VMM 201 for the exclusive use of the virtual machines, so that a given virtual machine is the only virtual machine that should be accessing data in the corresponding region. In this case, PTCM 217 is referred to as a "guest PTCM".

In one embodiment, one or a plurality caches that are core specific, for example L2 caches 213, include one or a plurality of DLCRs 214 that are used to store and lock copies of page tables associated with PTCM 217. In other embodiments, caches in processor 208 that are shared by a plurality of cores, for example L3 cache 215, include one or a plurality of DLCRs 224 as well. The DLCRs 224 are allocated by VMM PTCM allocation system 202, or, in the case of the absence of a VMM, by OS PTCM allocation system 204.

In various embodiments, as is known by those familiar in the art, VMM 201, OSs 203, and MMUs 211 work in conjunction to handle memory access requests by programs running on virtual machines on cores 209. This functionality can include, without limitation, shadow page tables and nested page tables (not shown in FIG. 2).

In various embodiments, for the case when processing system 200 is accessed by virtual machines, guest PTCM page tables (not shown) can be augmented, without limitation, through functionality in VMM 201 and guest OSs 203 with PTCM shadow page tables 219 or PTCM nested page tables 220 (depicted in FIG. 2).

In the case of the VMM 201 using shadow page tables, OS PTCM allocation system 204 that is part of the guest operating system associated with a particular guest PTCM indicates to VMM PTCM allocation system 202 that the VMM 201 is to use contiguous system physical pages for the shadow page tables associated with the respective guest PTCM's guest virtual memory addresses, by, for example, and without limitation, setting a bit in a privileged virtual machine register. These contiguous system physical pages are then copied to and locked in the system processor caches by VMM PTCM allocation system 202.

In the case of the VMM 201 using nested page tables, OS PTCM allocation system 204 that is part of the guest operating system associated with a particular guest PTCM indicates to VMM PTCM allocation system 202 that the guest page tables associated with the guest virtual address range of the guest PTCM are to be mapped to contiguous system pages by, for example, and without limitation, setting a bit in a privileged virtual machine register. These contiguous system physical pages are then copied to and locked in the system processor caches by VMM PTCM allocation system 202.

In various embodiments, PTCMs 217 can be shared between a plurality of cores 209 such that virtual addresses from multiple virtual address spaces are mapped to the same physical memory by VMM PTCM allocation system 202, or, in the case of the absence of a VMM 201, by OS PTCM allocation system 204. The shared property is indicated to the OS PTCM allocation system by the PTCM user at allocation time by, for example, and without limitation, a parameter in a system library call.

As is known by those familiar in the art, OS managed software processes can migrate between cores 209. In the case of process migration, PTCM associated page tables (e.g. PTCM page tables 218, PTCM shadow page tables 219, and PTCM nested page tables 220) must migrate between core-specific DLCRs 214 as well. This migration is implemented by functionality in VMM PTCM allocation system 202 as directed by VMM 201, or, in the case of the absence of a VMM 201, by OS PTCM allocation system 204 as directed by OS 203 by, for example, and without limitation, a software function call.

Figure 3:
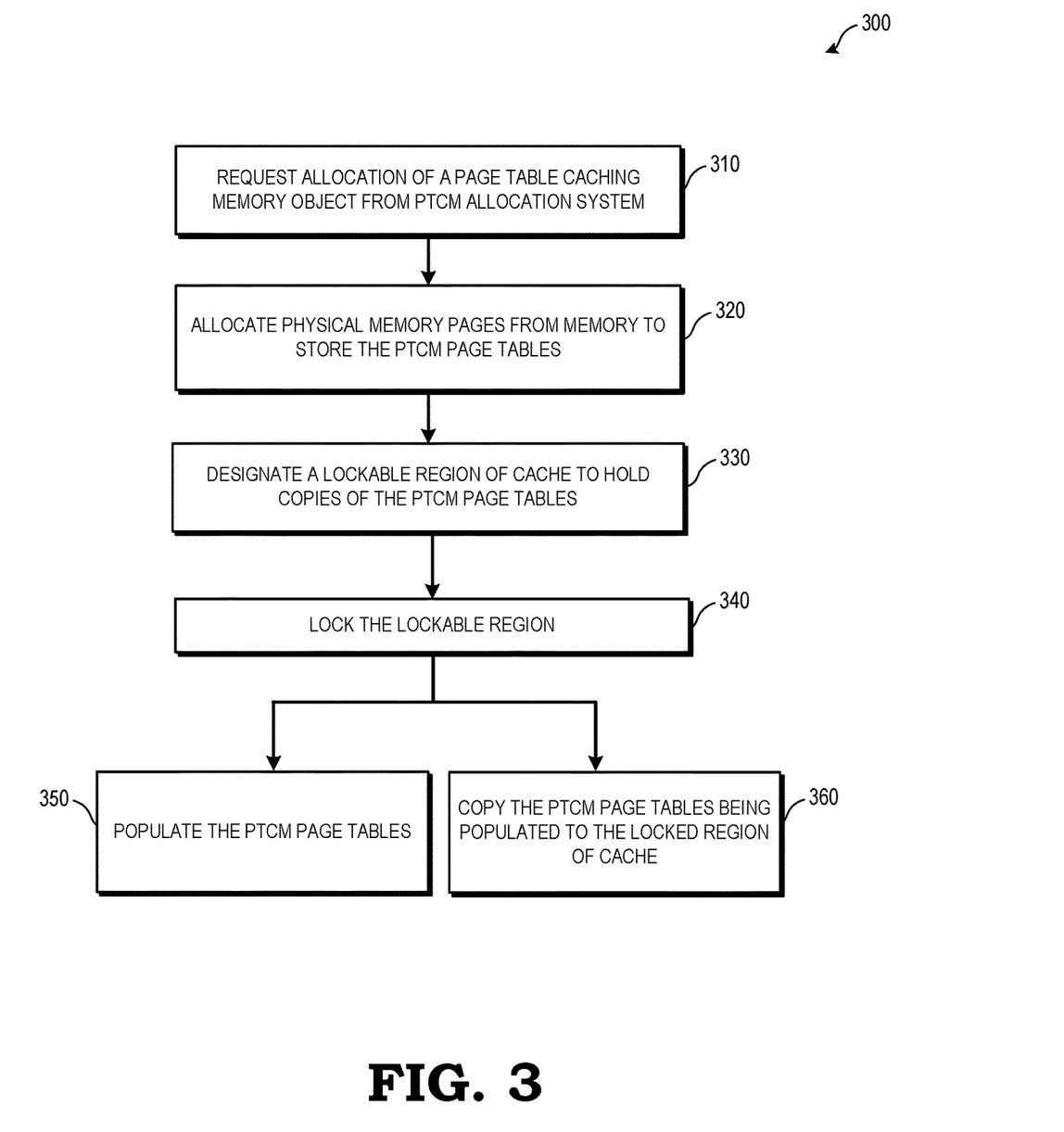
FIG. 3 is a flow diagram illustrating a method for allocating PTCMs in accordance with some embodiments.

FIG. 3 presents a block diagram illustrating a process 300 for allocating PTCMs 109 in accordance with some embodiments. The operations shown are presented as a general example of operations performed by some embodiments. The operations performed by other embodiments include different operations and/or operations that are performed in different order. Additionally, although certain mechanisms/elements are used in describing the operations (e.g., PTCM allocation system 102, cache 106, etc.), in some embodiments, other mechanisms/elements can also be employed.

With reference to FIGS. 1 and 2, the process 300 commences at block 310, where PTCM allocation system 102 begins allocation of a PTCM 109 for use by the user of processing system 100. In some embodiments, the allocation begins with a user request to PTCM allocation system 102 for a buffer having locked page tables, i.e., PTCM 109.

At block 320, physical memory pages from memory 108 are allocated to store the data of PTCM 109 and to store the PTCM page tables 111. In some embodiments these physical pages are reserved in advance from the full set of available memory pages in OS 101 in a pool by PTCM allocation system 102 for this purpose. In yet other embodiments, only a subset of the physical pages are reserved in advance. The quantity of physical pages reserved can be done, for example, and without limitation, at OS 101 kernel compile time, at OS 101 startup (boot) time, or at OS 101 runtime via various mechanisms, such as, and without limitation, a compile time parameter, a kernel boot argument, or a system command.

At block 330, a lockable region of processor memory cache 106, DLCR 107, is selected to store locked copies of PTCM page tables 111. In some embodiments, DLCR 107 is only large enough to store a subset of PTCM page tables 111. In some embodiments, DLCR 107 includes a plurality of regions from a plurality of caches in processor 104.

At block 340, DLCR 107 is locked. As described above, "locking" means that the data stored in DLCR 107 is not evicted until "unlocked". DLCR 107 can still be invalidated by normal functionality of OS 101, however, in which case PTCM page tables 111 will be re-copied to DLCR 107 by PTCM allocation system 102.

At block 350, the PTCM page tables 110 are populated with PTEs and related data and linked to other page tables 110. In some embodiments, populating is done directly by PTCM allocation system 102. In alternate embodiments, populating is done by OS 101 using typical OS populating functionality.

At block 360, PTCM page tables 110 are copied to DLCR 107 in cache 106. In some embodiments, copying is done directly by PTCM allocation system 102 after PTCM page tables 110 are populated. In alternate embodiments, PTCM page tables 110 are copied to the DLCR using typical data caching functionality of processor 104 and cache 106 that occurs while data is being written to PTCM page tables 110. After the PTCM page tables 110 have been populated and copied to the locked region of the cache, processing system 100 (and similarly, processing system 200) is able to reduce address translation latency during memory accesses to PTCM 109.

Figure 4:
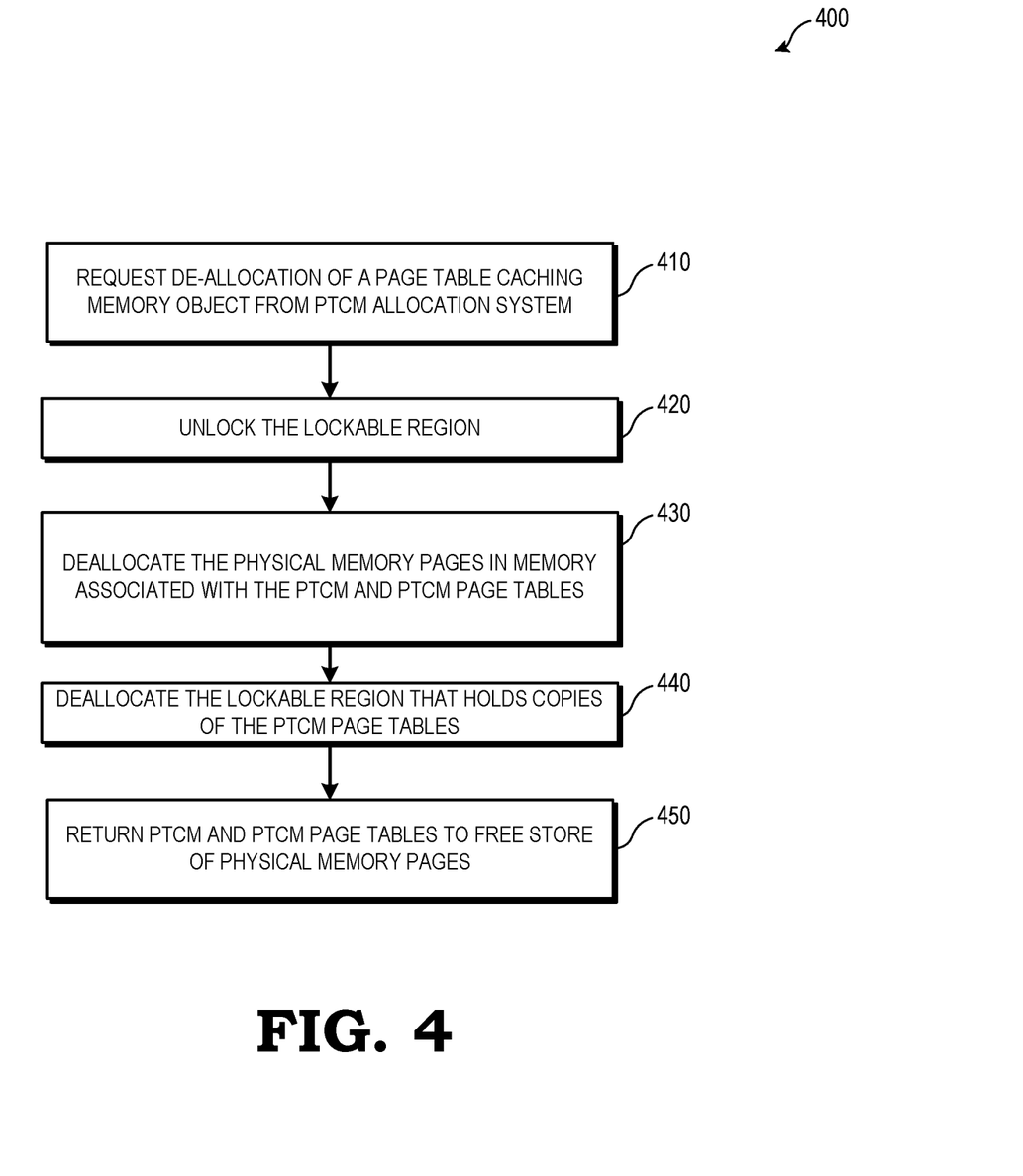
FIG. 4 is a flow diagram illustrating a method for de-allocating PTCMs in accordance with some embodiments.

FIG. 4 presents a block diagram illustrating a process 400 for de-allocating PTCMs 109 in accordance with some embodiments. In various embodiments, de-allocation is initiated by the user of the PTCM 109, as in block 410, for example, by using a library function invocation which notifies PTCM allocation system 102 to de-allocate PTCM 109.

At block 420, the PTCM allocation system 102 unlocks the DLCRs 107 associated with PTCM 109. In some embodiments, after block 420, the respective caches regions of DLCR 107 are now available to other users of cache 106 for cache storage. In other embodiments the regions of DLCR 107 remain reserved by the PTCM allocation system 102.

At block 430, the physical memory pages located in memory 108 that are associated with the PTCM 109 and PTCM page tables 111 are de-allocated by PTCM allocation system 102. At block 440, the lockable region of cache 106 that is used to hold copies of the PTCM page tables 111 is deallocated. In some embodiments, at block 450, de-allocation returns all associated physical pages to the memory free store of OS 101. In other allocations, a plurality of the physical pages are kept reserved by PTCM allocation system 102 for usage for future allocations.

In some embodiments, the apparatus and techniques described above are implemented in a system including one or more integrated circuit (IC) devices (also referred to as integrated circuit packages or microchips), such as the systems described above with reference to FIGS. 1-4. Electronic design automation (EDA) and computer aided design (CAD) software tools can be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device can be stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc , magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

Note that not all of the activities or elements described above in the general description are required, that a portion of a specific activity or device can not be required, and that one or more further activities can be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A method, comprising:
   receiving a request for allocation of at least one page table caching memory (PTCM) object at a PTCM allocation system;
   allocating, using the PTCM allocation system, a plurality of physical memory pages from a memory to store at least one PTCM page table associated with the at least one PTCM object;
   designating, at the PTCM allocation system, at least one lockable region of a cache to hold a copy of the at least one PTCM page table;
   locking, using the PTCM allocation system, the at least one lockable region of the cache by using a lock enable command;
   populating, using the PTCM allocation system, the at least one PTCM page table by transferring a plurality of page table entries associated with the at least one PTCM object to the at least one PTCM page table; and
   copying, using the PTCM allocation system and to the locked at least one lockable region of the cache, the at least one PTCM page table being populated by providing a duplicate of the at least one PTCM page table being populated to the locked at least one lockable region of the cache.

2. The method of claim 1, wherein:
   the at least one PTCM object includes at least one additional PTCM object of a plurality of PTCM objects.

3. The method of claim 1, wherein:
   the at least one lockable region includes at least one second, additional lockable region of a plurality of lockable regions.

4. The method of claim 1, wherein:
   populating the at least one PTCM page table and copying the at least one PTCM page table occur simultaneously.

5. The method of claim 1, wherein:
   allocating the plurality of physical memory pages to store the at least one PTCM page table is initiated by a system call or a kernel boot parameter.

6. The method of claim 1, wherein:
   the at least one PTCM page table is restored to the cache that has been invalidated by a system management function.

7. The method of claim 1, further comprising:
   receiving, at the PTCM allocation system, a request for deallocation of the at least one PTCM object;
   unlocking, using the PTCM allocation system, the locked at least one lockable region of the cache by using a lock disable command; and
   returning the at least one PTCM object and the at least one PTCM page table to a free store of the physical memory pages.

8. The method of claim 1, wherein:
   the at least one PTCM object is a guest PTCM object associated with a virtual machine.

9. The method of claim 8, wherein:
   the at least one PTCM page table is associated with the guest PTCM object of the virtual machine, at least one PTCM page table being augmented by at least one of a PTCM shadow page table or a PTCM nested page table.

10. A processing system, comprising:
a processor configured to be coupled to a memory, wherein the processing system is configured to:
  receive a request for allocation of at least one page table caching memory (PTCM) object at a PTCM allocation system;
  allocate, using the PTCM allocation system, a plurality of physical memory pages from the memory to store at least one PTCM page table associated with the at least one PTCM object;
  designate, at the PTCM allocation system, at least one lockable region of a cache to hold a copy of the at least one PTCM page table;
  lock, using the PTCM allocation system, the at least one lockable region of the cache by using a lock enable command;
  populate, using the PTCM allocation system, the at least one PTCM page table by transferring a plurality of page table entries associated with the at least one PTCM object to the at least one PTCM page table; and
  copy, using the PTCM allocation system and to the locked at least one lockable region of the cache, the at least one PTCM page table being populated by providing a duplicate of the at least one PTCM page table being populated to the locked at least one lockable region of the cache.

11. The processing system of claim 10, wherein:
the at least one PTCM object includes at least one additional PTCM object of a plurality of PTCM objects.

12. The processing system of claim 10, wherein:
the at least one lockable region includes at least one second, additional lockable region of a plurality of lockable regions.

13. The processing system of claim 10, wherein:
the PTCM allocation system is configured to populate the at least one PTCM page table and copy the at least one PTCM page table simultaneously.

14. The processing system of claim 10, wherein:
the PTCM allocation system is configured to allocate the plurality of physical memory pages to store the at least one PTCM page tables such that the allocation is initiated by a system call or a kernel boot parameter.

15. The processing system of claim 10, wherein:
the at least one PTCM page table is restored to the cache that has been invalidated by a system management function.

16. The processing system of claim 10, the processing system further is configured to:
request deallocation of the at least one PTCM object;
unlock the locked at least one lockable region of the cache; and
return the at least one PTCM object and the at least one PTCM page table to free store of the physical memory pages.

17. The processing system of claim 10, wherein:
the at least one PTCM object is at least one guest PTCM object associated with a virtual machine, the at least one PTCM page table being associated with the at least one guest PTCM object of the virtual machine and augmented by at least one of a PTCM shadow page table or a PTCM nested page table.

18. A non-transitory machine-readable medium having stored thereon machine-readable instructions executable to cause a machine to perform operations, comprising:
  receiving a request for allocation of at least one page table caching memory (PTCM) object at a PTCM allocation system;
  allocating, using the PTCM allocation system, a plurality of physical memory pages from a memory to store at least one PTCM page table associated with the at least one PTCM object;
  designating, using the PTCM allocation system, at least one lockable region of a cache to hold a copy of the at least one PTCM page table;
  locking, using the PTCM allocation system, the at least one lockable region of the cache using a lock enable command;
  populating, using the PTCM allocation system, the at least one PTCM page table with a plurality of page table entries associated with the at least one PTCM object; and
  copying, using the PTCM allocation system and to the locked at least one lockable region of the cache, the at least one PTCM page table being populated by providing a duplicate of the at least one PTCM page table being populated to the locked at least one lockable region of the cache.

19. The non-transitory machine-readable medium of claim 18, wherein:
populating the at least one PTCM page table and copying the at least one PTCM page table occur simultaneously.

20. The non-transitory machine-readable medium of claim 18, further comprising:
  receiving a request for deallocation of the at least one PTCM object at the PTCM allocation system;
  unlocking, using the PTCM allocation system, the locked at least one lockable region of the cache using a lock disable command; and
  returning the at least one PTCM object and the at least one PTCM page table to free store of the physical memory pages.

* * * * *